United States Patent [19]
Choate et al.

[11] Patent Number: 5,347,469
[45] Date of Patent: Sep. 13, 1994

[54] COVERT RANGING METHOD AND SYSTEM

[76] Inventors: William C. Choate, 6247 Twin Oaks Cir., Dallas, Tex. 75240; Charles E. Frey, 4921 S. Colony Blvd., Colony, Tex. 75056; Anthony K. Tyree, 1917 Walters, Plano, Tex. 75023

[21] Appl. No.: 918,534

[22] Filed: Jul. 22, 1992

[51] Int. Cl.$^5$ ............................................. G06F 15/00
[52] U.S. Cl. ................................. 364/516; 364/461; 364/423; 235/411
[58] Field of Search ..................... 364/516, 461, 423; 342/29, 30; 235/411, 412, 413

[56] References Cited

U.S. PATENT DOCUMENTS

| | | | |
|---|---|---|---|
| 3,935,572 | 1/1976 | Broniwitz et al. | 342/80 |
| 4,814,994 | 3/1989 | Doane et al. | 364/460 |
| 4,954,837 | 9/1990 | Baird et al. | 342/458 |
| 4,959,800 | 9/1990 | Wolley | 364/516 |
| 5,095,467 | 3/1992 | Olson et al. | 367/125 |
| 5,164,910 | 11/1992 | Lawson et al. | 364/516 |

OTHER PUBLICATIONS

Noel Collins and Charles Baird, *Terrain Aided Passive Estimation*, IEEE 1989 National Aerospace and Electronics Conference Naecon 1989, vol. 2, May 1989, Dayton, Ohio, pp. 906–916, XP76441.

*Primary Examiner*—Thomas G. Black
*Assistant Examiner*—Susan Wieland
*Attorney, Agent, or Firm*—Robert L. Troike; Richard L. Donaldson

[57] ABSTRACT

A method and system for covertly determining and predicting air-to-air target data relative to a predetermined position passively senses the target (84) to produce a passive target data set. Next, the method and system transform (14) the passive target data set to produce a transformed passive data set. Then, the system compares (22) the transformed passive data set to a predicted data set (20) to generate a measurement error. By actively sensing (38 and 40) the target for a minimally detectable period (42) of time to produce an active target data set (28), the system applies constraints (28) and therefrom computes penalties (26) that relate to the measurement error (22) to produce a system error. Then, in response to the system error (24) the method and system compute the direction (30) and magnitude (32) for a perturbation or a response (44) to the predicted target data (18). These steps are repeated to covertly determine target data relative to the predetermined position (16) for improved covert air-to-air ranging.

25 Claims, 4 Drawing Sheets

COVERT RANGING METHOD AND SYSTEM

TECHNICAL FIELD OF THE INVENTION

The present invention generally relates to target ranging methods and systems and more particularly to a covert ranging method and system based on passive target ranging in conjunction with active sensing that fixes target range to resolve range and speed ambiguity.

BACKGROUND OF THE INVENTION

For a wide variety of military and civilian aviation scenarios air-to-air passive ranging provides a useful way to determine distances between aircraft. The goal of air-to-air passive ranging is to determine the range from one aircraft, called "ownship," to another, called "target", by detecting energy emanating from the target. For this purpose, "ownship" may be equipped with directional receivers that measure the angle of the arriving energy during a data collection interval. To this are added fixes of "ownship's" position and heading obtained from an inertial navigation system (INS) onboard ownship. For most applications, the energy will be in the radio-frequency (RF) or infrared (IR) regions of the electromagnetic spectrum.

A RF system may monitor radar transmissions and RF communications from the target for these purposes. Very long detection ranges are feasible that substantially exceed those at which target could acquire ownship on its own radar. Thus, ownship may be able to locate target without itself being detectable. In this situation, the primary advantage of passive ranging is gained: stealth. Long acquisition range also affords ownship more time to detect target's presence. The directional receiver may be implemented by a two-axis RF interferometer or several such units covering different fields of view.

The infrared system would sense black body radiation emanated from the target. Therefore, operation does not depend on target transmission protocol. Detection range is considerably reduced and ownship would be within range of target's radar. Two factors mitigate this risk: (1) the target might restrict radar usage to avoid detection and (2) convergence time is considerably less for IR passive ranging systems. The latter is attributable to the shorter operating ranges and the higher spatial resolution of the IR sensor. The directional receiver may be implemented using a FLIR imager and video tracker.

A principal deficiency in all air-to-air passive ranging method is ill-conditioning. This is a condition in which small errors in the measurements can cause much larger ones in the computed ranges. There are two principal causes of ill-conditioning: (1) a limited baseline for ranging data; and (2) the need to infer target motion from the data. The relation between baseline ranging accuracy may be explained in terms of triangulation. This is appropriate, although there is no explicit triangulation step in the ranging algorithm, since a triangulation principle is at work whenever range is estimated from sightings at different locations. Factors affecting triangulation accuracy will have similar effects on ranging accuracy. Two of these are the lengths and direction of the baseline ranging data.

Accordingly, there is a need for a method and system that avoids ill-conditioning in passive air-to-air ranging by overcoming the limited ranging data baseline and target motion inference problems of the prior art.

SUMMARY OF THE INVENTION

The present invention, accordingly, provides a covert ranging method and system that overcomes or reduces disadvantages and limitations associated with prior passive air-to-air ranging methods and system.

One aspect of the invention is a method for covertly determining and predicting air-to-air target range and speed data relative to a predetermined position. The method includes the steps of passively sensing a target to produce a passive target data set and then relating the passive target data set to a predetermined position. This produces a transformed passive data set that may be compared to a predicted target data set. This comparison generates a measurement error. The method further actively senses a target for a minimally detectable period of time to produce an active target data set and then relates the active target data set to the previously determined measurement error to produce a system error. Then, the method changes the predicted target data in response to the system error. In an operational target environment, the method and system of the present invention repeat the above steps continuously to covertly determine target data relative to the predetermined position.

A technical advantage of the present invention is that by using random or quasi-random flashes of active radar signals, the method and system perform covert ranging and, at the same time, overcome the limited ranging data base line and target motion inference problems associated with a purely passive ranging system.

Another technical advantage of the present invention is the simplifying of computations necessary for dynamic modeling of the air-to-air passive ranging problem. By bracketing the scope of the search necessary for ranging, the present invention improves the computational efficiency of the air-to-air ranging algorithm. In the present invention, penalties are imposed when target data values exceed predetermined brackets. Additionally, optimal magnitudes of dynamic target model perturbations are determined that assure a level of stability within the dynamic target model. This avoids the detrimental effects of ill-conditioning in the air-to-air passive ranging algorithm.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The preferred embodiment of the present invention is best understood by referring to the FIGUREs wherein like numerals are used for like and corresponding parts of the various drawings.

The covert ranging system of the preferred embodiment is based on a passive ranging system involving the use of an active radar sensor. The active radar obtains a fix on the target range by a "flash illumination" a transmission too short to detect in most circumstances. Consequently, ownship's location is not compromised in any circumstances. This active radar fix resolves the range and speed ambiguity that may otherwise slow conversion of the completely passive ranging system. Once resolved, the passive ranging system maintains an accurate fix on range as long as the target maintains at constant velocity. Any subsequent departure from the assumed flight path can be detected and corrections provided by a subsequent "flash illumination."

Figure 1:
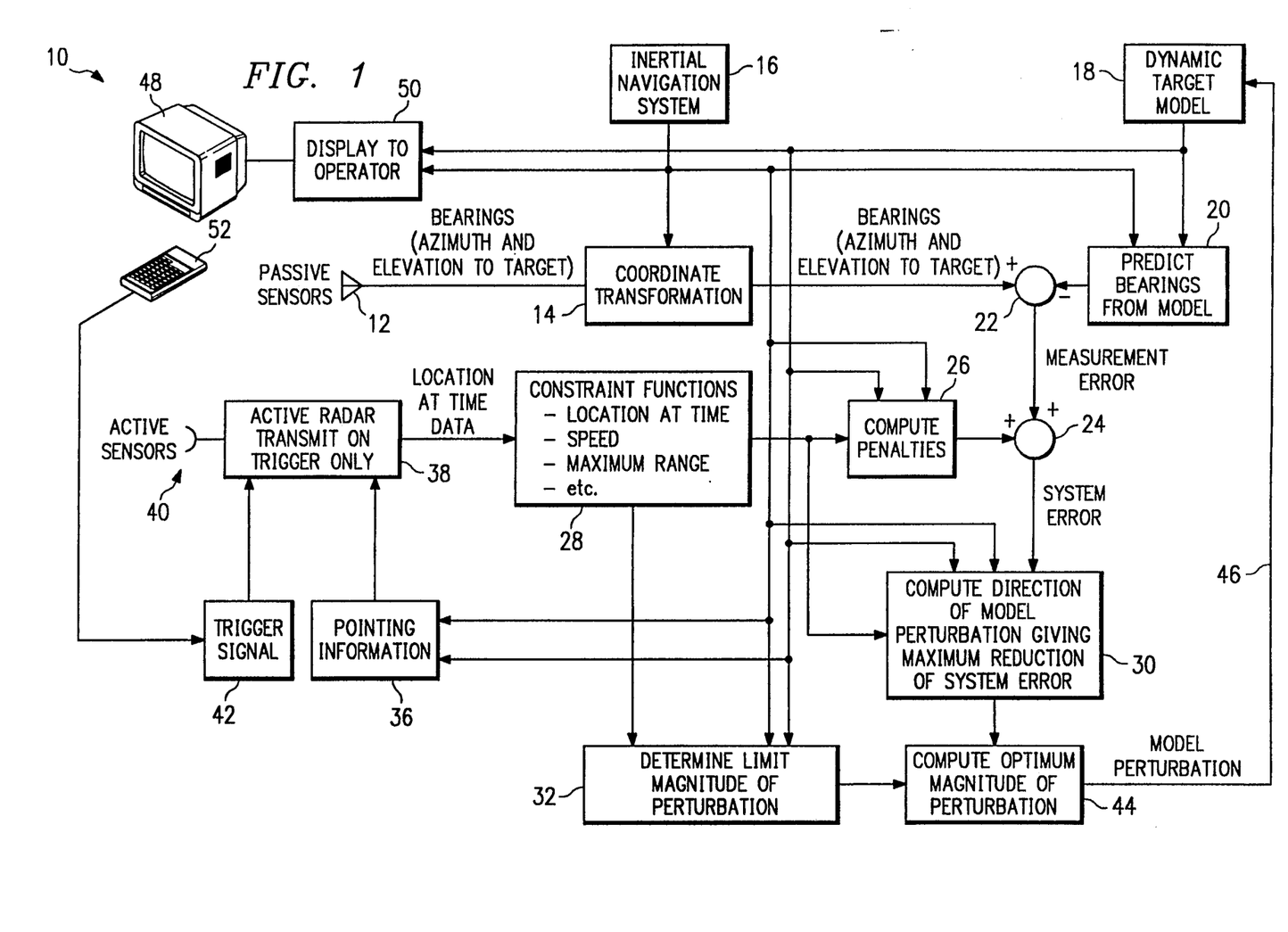
FIG. 1 provides a flow block diagram of the covert ranging system of the preferred embodiment.

FIG. 1 shows a system block diagram 10 of the covert ranging system of the preferred embodiment. Beginning with passive sensors 12, covert ranging system 10 shows that bearings relative to the body axes of the sensing aircraft are taken and sent to coordinate transformation unit 14. At coordinate transformation unit 14, navigation data from the aircraft's inertial navigation system (INS) 16 transforms these bearings into azimuth and elevation data relative to the INS 16 coordinate system. While actual passive data is being received and transformed, a resident model in an associated computer system generates data as indicated by dynamic target model block 18. The resident model outputs this data as indicated by block 20 to predict bearings from model. At junction 22, actual data including bearings having azimuth and elevation are joined and compared with the predicted bearings from the dynamic target model to generate a measurement error. Then, at junction 24, computed penalties from block 26 are input to junction 24. These computed penalties take into consideration the output of constraint functions from block 28, as well as INS data from block 16 and parameters of the resident dynamic target model of block 18. Other outputs from the constraint functions block 28 include an input to block 30, discussed below. Constraint functions block 28 receives an output from active radar portion 38. Active radar portion 38 receives an active sensor input 40, a trigger signal indicated by block 42, and pointing information 36, as already mentioned.

Inertial navigation system 16 provides data to seven places in the covert ranging system 10 of the preferred embodiment. These include coordinate transformation block 14, predicted bearing block 20, compute penalty block 26, compute direction of model perturbation block 30, determine limit magnitude of perturbation block 32, pointing information block 36, and operator display unit 50. Similarly, dynamic target model 18 provides data to six points including predict bearings from model block 20, compute penalties block 26, compute direction of model perturbation block 30, determine limit of magnitude of perturbation block 32, pointing information block 36, and display to operator block 50.

Returning to junction 24, the composite of the output from computer penalties block 26 and the measurement error from junction 22 is formed to comprise a "system error." The system error goes to compute direction of model perturbation block 30, which gives the maximum reduction of system error. Output from model perturbation direction block 30 combines with output from perturbation magnitude limit block 32 to produce at block 44 an optimum magnitude of perturbation. This is performed by a "linear search" method such as Davidon's algorithm as described in "Davidon's Cubic Interpolation Method," *Methods of Optimization*, G. R. Walsh, ed. Sec. 39, pp. 97–102 (1975). From block 44, an optimal model perturbation results and a signal goes along line 46 to the resident dynamic target model within the associated computer system for operating the model at block 18.

In an operational system, for example, as well as the covert ranging system 10 continuously updating the target data, output goes to a monitor such as monitor 48 that displays to operator block 50 to exhibit a variety of useful information concerning target and ownship, for example, a running display of target's position relative to ownship. Also, operator control 52 may activate trigger signal block 42 to cause active radar 38 to send a flash of active radar energy that active sensors 40 receive. This may be in response to a signal from display to operator block 50 that an active fix would be beneficial, as when target acceleration.

In the preferred embodiment, constraint functions block 28 uses constraints such as location at time, speed, maximum range, etc., that may be switched on or off according to the availability of necessary and relevant data. Additionally, active radar block 38 may instead be a laser device or "ladar" that generates a laser signal in the light or infrared energy producing wavelengths of the electromagnetic spectrum.

The following discussion illustrates the passive air-to-air ranging problem that the preferred embodiment solves. This material may be supplemented by Appendix A (Appendices A and B are available in filewrapper) for a more complete understanding. In air-to-ground ranging, for example, the target may be presumed stationary and ranging amounts to determining its special coordinates in three-dimensional space. Thus, an air-to-ground model representing the target has three degrees of freedom. This may be further reduced to two degrees of freedom if the altitude of ownship relative to target is known. The situation is more complicated in air-to-air ranging where the model must describe target's position as a function of time. Accordingly, the air-to-air ranging problem applies a model known as the "kinematic" model. The additional degrees of freedom necessary for the kinematic model aggravate ill-conditioning, because they decrease the redundancy through which noise is rejected. To recover from the ill-conditioning that occurs, the data collection interval must be extended. This has the effect of slowing conversions of the algorithm.

In the passive air-to-air ranging problem, the form of the kinematic model is assumed a priori. This, in effect, limits the scope of the motion that may described. Over a short interval, a simple model suffices. The more complex motion possible in a longer interval may be accompanied by a more complex model. However, this may be counterproductive because of the associated need for more data and a longer data collection interval. Therefore, the preferred embodiment adopts a relatively simple model having six degrees of freedom. This is equivalent to assuming that the target flies in approximately a straight line path during data collection. For reliable performance, the convergence time of the algorithm should be short enough to make this a good assumption.

Therefore, factors affecting rate of convergence, such as measurement accuracy, are extremely important. However, it has been shown that unmodeled target accelerations are not always detrimental to ranging accuracy.

Figure 2:
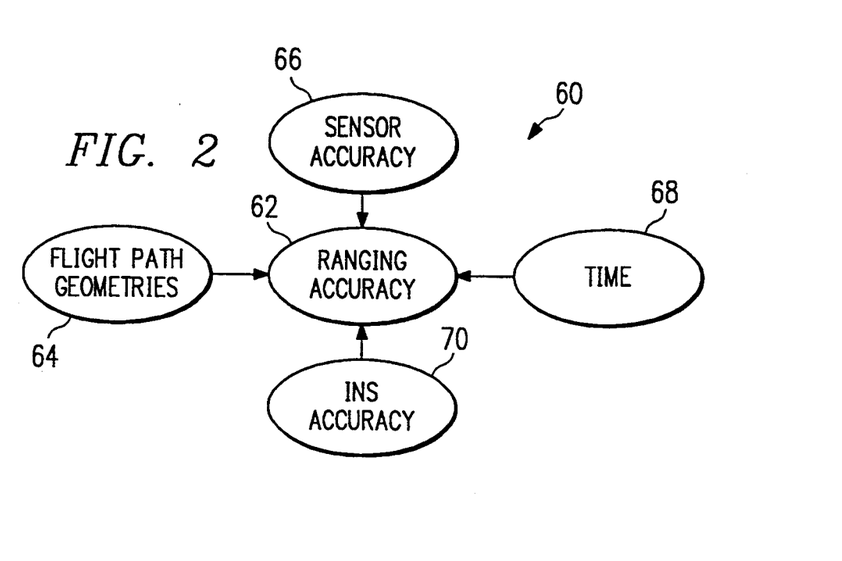
FIG. 2 shows factors effecting passive ranging accuracy.

FIG. 2 shows a conceptual data flow diagram 60 to illustrate the interplay of factors affecting ranging accuracy in the preferred embodiment. With reference to FIG. 2, data flow diagram 60 has at its center ranging accuracy domain 62. Ranging accuracy domain 62 is affected by the flight path geometries that domain 64 indicates (i.e., data collection internal), sensor accuracy that domain 66 indicates, time that domain 68 indicates, and INS accuracy that domain 70 indicates.

An example of the interplay for ranging accuracy that domain 62 indicates may be as follows. Ranging accuracy 62 may be maintained while the data collection internal 68 is reduced by improving sensor accuracy 66 or as a result of more favorable flight path geometries 64. Favorable geometries are characterized by high angular rates of change of bearings. As a result, a shorter data collection internal is possible at shorter ranges (e.g., it takes twice as long to establish a particular geometry at a 100 km as at 50 km). A system which requires a shorter data collection interval to attain a given accuracy is said to "converge faster."

Figure 3:
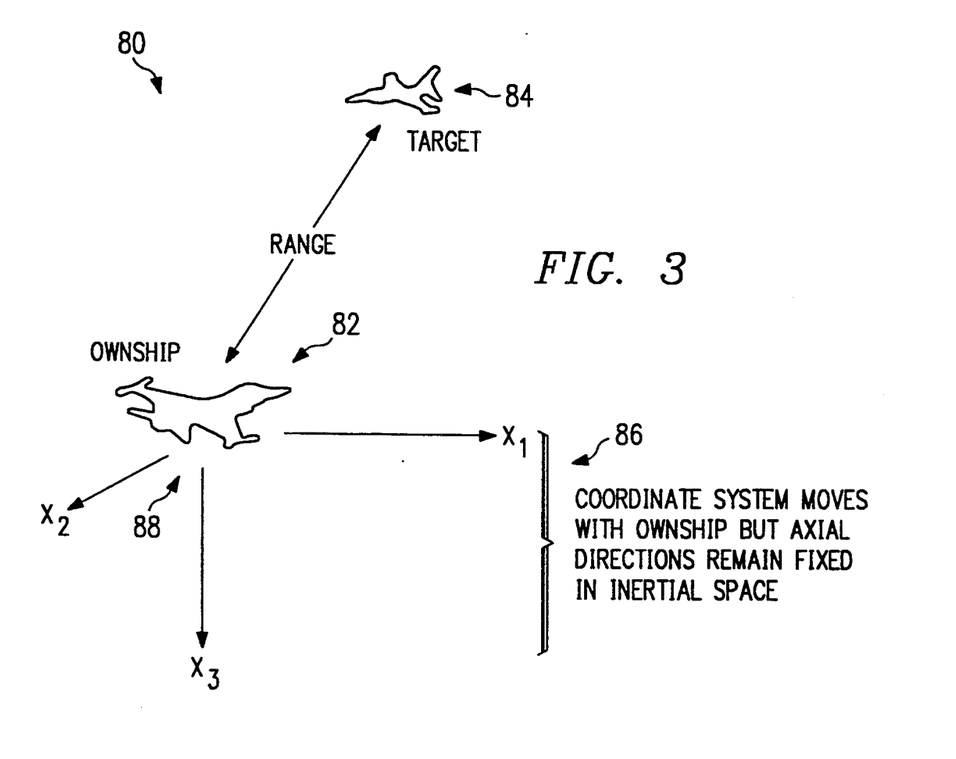
FIG. 3 illustrates the geometry of air-to-air ranging.

FIG. 3 graphically depicts an air-to-air encounter 80 that the preferred embodiment addresses. Consider air-to-air encounter sketch 80 where ownship 82 seeks to obtain a range to target 84. In this encounter, coordinate system 86 moves in translation so that ownship 82 remains at the origin 88 at all times. The directions of the axis, $X_1$, $X_2$, and $X_3$ are then fixed in inertial space by references from the ownship INS. Bearing measurements may then be assumed as referenced to these axis rather than to the body axis of ownship. Time is taken as zero at the onset of data collection. In this scenario, an important limitation is that range is indeterminate in the absence of ownship acceleration. As a result, there is a fundamental ambiguity between range and speed. This means that there are infinitely many target models consistent with a particular set of sightings in such a case. As described in Appendix A (Appendix A and B are available in filewrapper), the preferred embodiment solves this ambiguity problem.

The preferred embodiment characterizes the formulation of passive ranging as an inverse problem. The goal of the inverse problem is to find the kinematic model which is most consistent with the measured azimuth and elevations recorded during the data collection interval. These measurements are referred to as "actual data." Consistency is determined by numerically computed "synthetic data" from the model in comparing on a one-two-one basis with the actual data. The result is summarized by a single non-negative number called "measurement error." As mentioned, the form of the model is assumed a priori. The task of the algorithm therefore is to evaluate the parameters of the model. U.S. patent application Ser. No. 07/008,432, entitled "Method and Apparatus for Air-to-Air Aircraft Ranging" by Choate et. al. and assigned to Texas Instrument Incorporated describes this process and is here incorporated by reference.

As described in U.S. patent application Ser. No. 07/008,432, the minimization problem uses the following recursive procedure to dynamically model target data:

(a) a start-up model is chosen;

(b) a perturbation of the model δm, which causes the measurement error, J, to decrease is computed;

(c) a search is conducted along a straight line in the parameter space of the model for the minimum of J. The model which minimizes J becomes the new resident model. The direction of a straight line is given by (b);

(d) if several consecutive iterations leave the model virtually unchanged, the resident model is taken as the solution. Otherwise, a new iteration is begun at (b).

To find the perturbation direction as indicated at block 30 of FIG. 1, the preferred embodiment derives approximate expressions for $J(m+\delta \hat{m})$ which is accurate for small $\delta \hat{m}$ and which is simple enough that a closed form expression can be found for $\delta \hat{m}$. This solved for $\delta \hat{m}$. Only the direction is used, magnitude is recomputed in step (c), above. The approximate expression is a Taylor series truncated after the second or third term which may be derived by several associated solution techniques.

One solution technique to this problem may be the gradient method, also known as the method of steepest descent. Another method may be the conjugate gradient method. Yet another method may be Newton-Raphson algorithm, which utilizes a second degree approximation that remains accurate for probations of much greater magnitude. The Newton-Raphson algorithm makes feasible larger step sizes with fewer iterations to achieve conversions. This process, unfortunately, requires increased per-iteration processing. Another method that the preferred embodiment may use is a computation of the Hessian matrix used in the Newton-Raphan algorithm. All of these solution techniques are described in more detail in Appendix A (Appendix A and B are available in filewrapper).

Perturbation magnitude is determined in step (c) of the ranging algorithm by a "linear search." This terminology derives from the fact that the minimum sighting error is sought along a straight line path in the parameter space of the model. The line passes through the origin and is directed in the perturbation direction determined in step (b) above. The only free parameter is perturbation magnitude, therefore, the search is one-dimensional. The minimum is determined by trial-and-error using a Davidon's Cubic Interpolation Method as stated previously. The computations are based on the exact model, rather than an approximation of finite degree, and, therefore, are themselves exact. This is the advantage of using step (c) to determine perturbation magnitude.

Davidon's algorithm works as follows in the preferred embodiment. A bracket containing the minimum is established. Normally, this is done by increasing the upper limit of the bracket until either of two conditions are meet:

(1) the derivative of J in the search direction is positive; or (2) J is larger than at the origin.

However, using the constraints introduced later herein, the preferred embodiment may compute it directly, and, thus avoid trial-and-error in most cases. Next, J and its first order derivative in the direction of the search are computed at the boundaries of the bracket. These four numbers determine the cubic polynomial which is taken as a model of J within the bracket. The minimum of the cubic may be readily computed analytically. The location of the minimum becomes a new boundary. Whether "upper" or "lower" depends on the value of the derivative of J. The following Table 1 defines this relationship:

TABLE 1

| Sign of Derivative of J | Classification of boundary |
| --- | --- |
| Negative | Lower |
| Positive | Upper |

If the derivative is zero, the location is returned as the solution of the linear search. Since the new boundary divides the original bracket, the width of the new bracket is reduced. If "small enough", the center of the bracket is returned as the solution of the linear search. Otherwise, a new polynomial is fitted to the new bracket and the procedure iterated. The current program exits when the uncertainty in range is 100 meters or less, and the uncertainty in velocity is 0.1 meters per second, or less.

Figure 4:
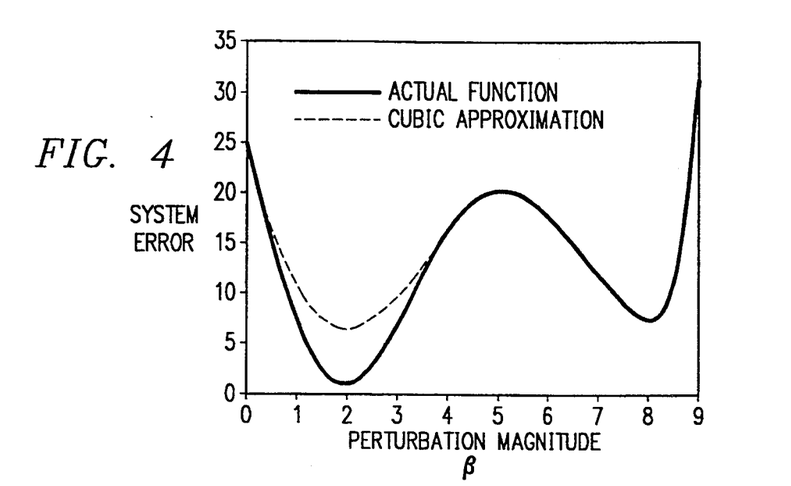
FIGS. 4 and 5 illustrate the operation of optimizing the dynamic ranging model according to the preferred embodiment.
Figure 5:
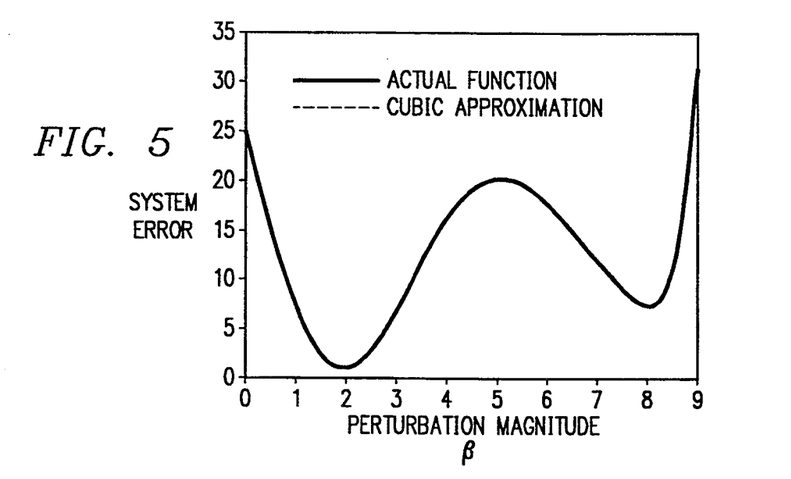

FIGS. 4 and 5 illustrate these operations. The solid curves give J as a function of perturbation magnitude. In FIG. 4, the initial bracket is the integral bracket [0,4]. The dashed curve is a plot of cubic polynomial matched to J and its derivative at the end-points. The fit in the interior is not particularly good, but the minima occur at similar locations. It is found that J is increasing at the minima of the cubic polynomial $\beta = 1.975$. Therefore, this becomes a new upper boundary. The polynomial has been refitted [0,1.975] in FIG. 5 [dashed curve]. The approximation is now quite accurate and the minima occur at virtually identical locations. This illustrates the rapid convergence that typifies the Davidon algorithm. However, in later iterations of the ranging algorithm, the topology of J can be exceptionally flat and subject to artifacts caused by numerical noise. As a result, a newly defined boundary may be consistently upper (lower) and situated very near the previous one. The preferred embodiment includes "accelerators" that detect condition and force a minimum reduction of bracket width.

The preferred embodiment employs constraints for making available to the ranging algorithm knowledge of the real-world that is not explicitly present in the data. The constraint function, by restricting the domain of feasible solutions, excludes unrealistic target models. This makes conversions more rapid and alleviates ill-conditioning to a large degree. While additional computations are needed to implement the constraint functions, these are largely offset by a reduction in the number of iterations. By using the constraints to determine the initial bracket in Davidon's algorithm, numerical overflow (underflow), which sometimes occurs when evaluating constraint functions within the stop-band, is avoided. The action of the constraints is indirect. More specifically, they are responsive to functions of model parameters—not to the parameters themselves. For example, the speed constraint is responsive to the magnitude of target velocity. Therefore, changes in velocity which preserve speed have no effect on the constraint. Further, the speed constraint is independent of the position components of the model.

The constraints are implemented as penalty functions which return non-negative numbers (penalties) which are very small when the constraint is satisfied and large when it is violated. The penalties add to the measurement error to yield to the "system error," which is minimized in solving the ranging problem. The fundamental structure of the ranging algorithm is unaffected by the constraints. Only the numbers appearing in the equation change. The additive nature of the constraints allows them to be developed and tested independently—a property of considerable practical importance.

The cost of implementing the constraints is substantially reduced by their independence of the measurements (time samples). Thus, calculations do not have to be performed over a sequence of N time samples, as do computations relating to measurement error. Further, a penalty function is often dependent on only a subset of the model parameters.

Since the penalties are negligibly small when the constraints are satisfied, the constraints have little effect on the result when the model is well within the feasible solution space. Clearly, it is important to choose constraint parameters so as not exclude the true target model. This must be balanced with the desire to restrict the feasible solution space for better ranging performance. To optimize this trade-off, it may be attractive to adapt the constraint parameters for each individual target. This could employ a priori information derived from intelligence sources or inferred from an electronic characterization of target transmissions.

Figure 6:
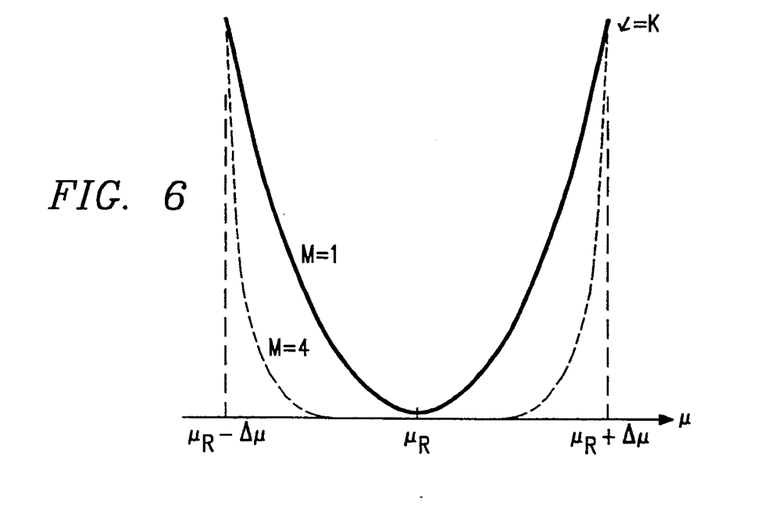
FIG. 6 shows two orders of special penalty that the preferred embodiment uses.

FIG. 6 illustrates two orders, denoted by the symbol M, for speed penalty. Note that as order increases, the influence of the constraint within the bandpass is reduced. In the limit ($M \to \infty$), the penalty function takes on the shape of rectangular well with zero penalty within the bandpass and infinite penalty outside. This is ideal theoretical behavior. But, from a practical standpoint orders above four or eight do not offer significant advantages.

Another useful constraint is a limit on maximum target acquisition range. This is known approximately from consideration of the power of target's radar, antenna gain of ownship's receiver, ambient noise level, etc. The location of target at acquisition is a basic component of the kinematic model of the target (see x(0), equation (2) below). Range is simply the Euclidian norm of x(0). Any exponential power of range, typically a positive even integer, can be used as the penalty function. The penalty is weighted to realize a desired penalty at the specified maximum acquisition range.

The preferred embodiment further includes a flight path adviser for processing early sighting data to do the following:

(1) Recommend an ownship maneuver to optimize ranging performance;

(2) Determine the start-up model to initiate data inversion; and (3) Detect a change of target velocity (i.e., target acceleration) indicating the need to revise the target model and possibly, a new active radar fix.

"Early sighting data" refer to sightings collected at the beginning of the data collection interval, for which ownship's velocity may be taken as approximately constant. Under this condition, relative target motion is confined to a plane in three-dimensional space. This implies that the salient features of the motion may be described in only two dimensions. As noted earlier, range can not be resolved in the absence of ownship acceleration. However, in the preferred embodiment it is possible to determine range if target speed is known. This is not the case, but often a reasonable estimate of speed is available. An accurate start-up model can be determined by "flash ranging."

From the flight path adviser, it is possible to determine noise level to indicate sensor performance. It is also possible to indicate the efficacy of the flight path geometry during a sensing. Appendix A illustrates how each of these steps may be performed. In the preferred embodiment, flash ranging significantly improves the accuracy of ranging algorithm. In particular, by including with a preferred embodiment the flash ranging using active sensors 40 of FIG. 1, serious ill-conditioning problems are overcome. To more fully understand the flash ranging aspect of the preferred embodiment, the following discussion provides a mathematical derivation of its use in the ranging algorithm. Additionally, Appendix B (Appendix A and B are available in filewrapper) provides an exemplary source code listing of the ranging algorithm of the preferred embodiment including the active flash ranging aspect. Dealing particularly with the flash ranging aspect of the preferred embodiment, we begin an exemplary mission at time, t=0 and then at sometime later, for example at $$t = \tau \tag{1}$$

active sensors 40 turn on to obtain a range fix on the target. For purposes of covert operation, the use of active sensors 40 is random or quasi-random. Active sensors 40 are off most of the time, thus making them very difficult to detect so that the target cannot sight or range on ownship. There are several kinds of information that can be determined from the active sensor:

(1) Range
(2) Doppler
(3) Bearing (azimuth and elevation).

Combined, range and bearing determine target's location relative to ownship. This can advantageously be used as a constraint when bearings from the active sensor are more reliable than those from the passive sensor. However, the passive sensor is at no fundamental disadvantage for determining bearing and may be preferred for this purpose. In this case, range information alone would be utilized for the constraint. Doppler gives the component of relative target velocity along the line-of-sight. This information is particularly difficult to determine passively and thus is highly complementary. As a constraint it would be applied to the velocity component of the model.

In the following we will describe how active range information can be incorporated as a constraint. Techniques for constructing constraints from active doppler and bearing measurements are similar. The range fix that active sensors 40 and active radar 38 obtain may be denoted, $\rho_N$, meaning the nominal range at time $\tau$. Since the use of active radar is expected to be very short and occasionally employed, in discussing the preferred embodiment, the use of active sensors 40 will be denoted "flash ranging." Note that flash ranging would be of limited value if it were not possible to maintain an accurate estimate of target location by passive means the majority of the time. As stated previously, the method and system of the preferred embodiment assume a linear kinematic model for relative target motion. This model may have the following model expression:

$$x(t) = x(0) + tv + a(t). \tag{2}$$

It will also be convenient to express the model as the following expression:

$$x(t) = L(t) \cdot m + a(t) \tag{3}$$

where the matrix L(t) takes the following form:

$$L(t) = [I \mid tI] \tag{4}$$

and m is a column vector consisting of the parameters of the model as follows:

$$m = [x_1(0) \; x_2(0) \; x_3(0) \; v_1 \; v_2 \; v_3]^T \tag{5}$$

The estimate $\rho_N$ at $\tau$ is introduced into the passive ranging method and system as a constraint that is implemented through the penalty functions that block 26 computes. The penalty function for the computations of block 26 may take the form:

$$\gamma = \frac{K_\gamma}{\Omega^2} (\rho - \rho_N)^2 \tag{6}$$

where $K_\gamma$ is the "gain", $\Omega$ is the "bandwidth," and $\rho$ is the range computed from the model expression for x(t) of Equation (3) at time $\tau$ through the following relationship:

$$\rho = \|x\| = \|L\,m + a\|. \tag{7}$$

In Equation (7), dependence on the time parameter $\tau$ is implicit. The exponent "2" appearing in (6) is used for the purpose of illustration and may be replaced by other positive even integers. For convenience in the following derivations, assume that $$\frac{K_\gamma}{\Omega^2} = 1.$$

This multiplicative scale factor may then be restored to the result.

In the air-to-air passive ranging algorithm, by introducing constraints through penalty functions and then adding them to the cost function of the system, it is possible to determine how well the measurements fit the measurements and the allowed scope of the model.

By computing partial derivatives of $\gamma$ with respect to model parameters, the following expressions obtain:

$$\frac{\partial \gamma}{\partial m_i} = 2(\rho - \rho_N) \frac{\partial \rho}{\partial m_i} \tag{8}$$

and $$\frac{\partial^2 \gamma}{\partial m_i \partial m_j} = 2 \frac{\partial \rho \partial \rho}{\partial m_i \partial m_j} + 2(\rho - \rho_N) \frac{\partial^2 \rho}{\partial m_i \partial m_j}. \tag{9}$$

With these expressions, it is possible to develop expressions for the derivatives of range with respect to model parameters. From Equation (7), $$\rho^2 = m^T L^T L m + m^T L^T a + a^T L m + a^T a. \tag{10}$$

As a result, $$2\rho \frac{\partial \rho}{\partial m_i} = 2 e_i^T L^T L m + 2 e_i^T L^T a \tag{11}$$

where $e_i$ is a unit vector of dimension six. It follows from Equation (3) that $$\frac{\partial \rho}{\partial m_i} = \frac{1}{\rho} l_i^T x(\tau) \tag{12}$$

where $l_i^T$ is the $i^{th}$ row of $L^T$.

By computing second derivatives, $$\frac{\partial^2 \rho}{\partial m_i \partial m_j} = \frac{\frac{\partial \rho}{\partial m_j}}{\rho^2}\left(\rho \frac{\partial \rho}{\partial m_i}\right) + \frac{1}{\rho} e_i^T L^T L e_j \tag{13}$$

Defining the 6×6 matrix as $$P = L^T L \triangleq [\rho_{ij}] \tag{14}$$

and $$\frac{\partial^2 \rho}{\partial m_i \partial m_j} = \frac{1}{\rho}\left[p_{ij} - \left(\frac{\partial \rho}{\partial m_i} \cdot \frac{\partial \rho}{\partial m_j}\right)\right]. \tag{15}$$

Further, denoting the gradient of $\gamma$ with respect to the model parameters m as $$g = \nabla_m \gamma \tag{16}$$

the following expression results from Equations (8) and (12).

$$g = \frac{2(\rho - \rho_N)}{\rho} L^T x(\tau) = 2(1 - \sigma) L^T x(\tau), \tag{17}$$

where $$\sigma = \rho_N/\rho. \tag{18}$$

Also, in modifying the ranging algorithm of U.S. patent application Ser. No. 07/008,342, as described above, it is important to modify the Hessian matrix that has the following definition:

$$H = \left[\frac{\partial \gamma}{\partial m_i \partial m_j}\right] \triangleq [h_{ij}] \tag{19}$$

The elements of the Hessian matrix were determined in Equation (9) above. However, a simpler expression results by substituting from Equation (15) to derive the following expression:

$$h_{ij} = 2\left[\left(\frac{\partial \rho}{\partial m_i} \cdot \frac{\partial \rho}{\partial m_j}\right) + \frac{(\rho - \rho_n)}{\rho}\left(p_{ij} - \frac{\partial \rho}{\partial m_i} \cdot \frac{\partial \rho}{\partial m_j}\right)\right] \tag{20}$$

$$= 2\left[\left(p_{ij}(1 - \sigma) + \sigma \frac{\partial \rho}{\partial m_i} \cdot \frac{\partial \rho}{\partial m_j}\right)\right].$$

It will be recalled, that the scale factor $$\frac{K_\gamma}{\Omega^2},$$

was assumed equal to 1 with the expectation that it would be restored subsequent to computation. This is possible now by simply multiplying H by $$\frac{K_\gamma}{\Omega^2}.$$

Moreover, numerical computations are greatly simplified by noting that $$g_{i+3} = \tau g_i, i = 1,3 \tag{21}$$
$$= 2\tau(1 - \sigma) x_i(\tau)$$

and $$H = \begin{bmatrix} H_1 & \tau H_1 \\ \tau H_1 & \tau^2 H_1 \end{bmatrix} \tag{22}$$

with $$H_1 = \begin{bmatrix} h_{11} & h_{12} & h_{13} \\ h_{21} & h_{22} & h_{23} \\ h_{31} & h_{32} & h_{33} \end{bmatrix} \tag{23}$$

and $h_{ij} = h_{ji}$ for $i = 1$, $j = 1,3$. Note that the derivative expressions now only need to be evaluated for three elements of the six elements g, and six elements of the 36 elements of H.

The gradient g and the Hessian H are used to approximate the range-at-time penalty function $\gamma$. An exact definition of $\gamma$ is given by equation (6). The approximation is given by $$\gamma(m + \delta m) = \gamma(m) + g^T \delta m + (\tfrac{1}{2}) \delta m^T H \delta m \tag{24}$$

and holds for all $\delta m$ of small magnitude. Used within the Newton-Raphson procedure, (a) can be used to compute in closed form the perturbation $\delta m$ for which $m + \delta m$ yields the minimum $\gamma$ (within the limits of the approximation). However, the objective is to minimize the system error J, not just the component $\gamma$. The extension presents no formal difficulty because system error is the sum of measurement error plus all penalties. The approximation for system error is simply the sum of expressions of the form (a), each of which may be derived independently. The approximate nature of the truncated series representation (a) limits accuracy of the solution $\delta m$ when the magnitude $\delta m$ is not very small. As a result, it is usually possible to improve the solution by rescaling it to optimum magnitude. This is done through a "linear search," so named because the path of the search is a straight line in solution space. There is no approximation error in the linear search, although the path is usually suboptimal.

In one-dimensional optimization problems of this sort, it is possible to search in a way similar to that described in U.S. patent application Ser. No. 07/008,342. However, constraints offer the opportunity to further bracket the scope of the search and, therefore, improve the computational efficiency of the search algorithm. As a result, it is possible to examine how the brackets are determined. For this purpose, the preferred embodiment assumes that, at the outset of the search, the system error is $J_0$. Obviously, then a successful search cannot result in a penalty exceeding $J_0$ (i.e., it is known that $$\gamma \leq J_0 \qquad (25)$$

in the preferred embodiment). The bracket boundaries are defined such that equality holds in Equation (25), thus yielding $$(\hat{\rho}-\rho_N)^2 = \alpha^2 \qquad (26)$$

Where $\alpha^2$ is $J_0 \Omega^2/K_\gamma$ and the carets " ˆ " an " ˇ " denote values at the bracket boundaries. Thus, bracket boundaries are attained when $$\hat{\rho} = \rho_N \pm \alpha \qquad (27)$$

Since $\rho$ is not the free parameter of the search, consider not its relationship to this parameter, denoted $\beta$. During the search, the dynamic target model may be expressed in the following form $$m = m_0 + \beta \delta m, \qquad (28)$$

where $\beta$ is the "distance" in the direction of the search $\delta m$, and $m_0$ is the unperturbed model. The corresponding relative target position is given by the following expression:

$$x(\tau) = L(\tau)[m_o + \beta \delta m] + a(\tau) \qquad (29)$$

or $$x(\tau) = x_o(\tau) + \beta d \qquad (30)$$

with $$d = L(\tau)\delta m. \qquad (31)$$

Taking the square of the Eucliclian norm of Equation (30), $$\rho^2 = \rho_o^2 + 2\beta(x_o, d) + \beta^2 \|d\|^2. \qquad (32)$$

Solving for $\beta$, it is then possible to obtain the expression $$\beta = \frac{-\langle x_o, d \rangle \pm \sqrt{\langle x_o, d \rangle^2 + \|d\|^2(\rho^2 - \rho_o^2)}}{\|d\|^2}. \qquad (33)$$

Because only the searches in the positive $\delta m$ direction are allowed, negative solutions to Equation (33) or those that are not purely real, are not accepted in the algorithm of the preferred embodiment.

Figure 7:
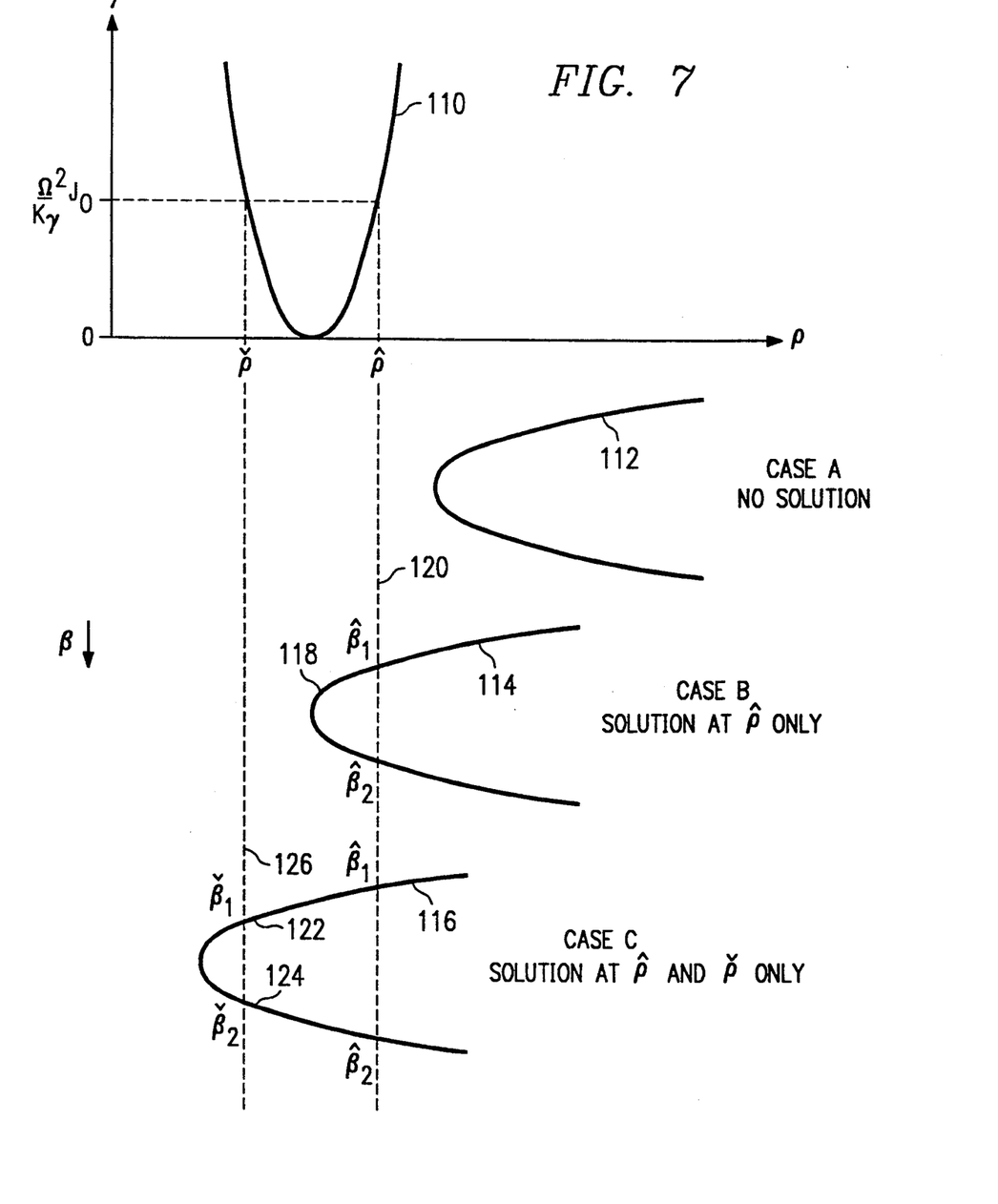
FIG. 7 illustrates the effects of bracketing the solution of the preferred embodiment.

FIG. 7 illustrates the bounding that occurs to obtain value for $\hat{\beta}_1$ and $\hat{\beta}_2$ by substituting $\hat{\rho}$ (See Equation (27)) for $\rho$ and Equation 33. Values for $\check{\beta}_1$ and $\check{\beta}_2$ are determined from $\check{\rho}$ in a similar manner. Referring to FIG. 7, there is shown the effect of the constraint for the penalty function. With curve 110 representing the penalty function the example imposes the constraint (27) so that the penalty cannot exceed $J_0$ without leaving the bracket $[\check{\rho}, \hat{\rho}]$. Additionally, with this constraint, curve 112 shows Case A where no solution occurs for Equation (33), since no positive real $\beta$ yields a $\rho$ within the bracket. Curve 114 shows Case B where a solution only at $\hat{\rho}$ occurs. Curve 116 shows Case C where a solution occurs at $\hat{\rho}$ and $\check{\rho}$. By straight forward differential calculus, it can be shown from Equation (32) that $$\min_\beta\{\rho^2\} = \rho_o^2 - \frac{\langle x_o, d \rangle^2}{\|d\|^2} \qquad (34)$$

If this exceeds $\hat{\rho}^2$, the square of the largest $\rho$ for which $\gamma$ equals $J_0$, there clearly is no solution. This is Case A that curve 114 describes. If, $$\check{\rho}^2 < \min_\beta\{\rho^2\} < \hat{\rho}^2, \qquad (35)$$

The solutions $\hat{\beta}_1$ and $\hat{\beta}_2$ exist for $\hat{\rho}$, but there are no solutions for $\check{\rho}$. Curve 114 shows this as Case B which is bracketed by $[\hat{\beta}_1, \hat{\beta}_2]$. This is that portion 118 to the left of the $\hat{\rho}$ dash line 120. If, further, there are solutions $\hat{\beta}_1$, $\hat{\beta}_2$ for $\hat{\rho}$ and solutions $\check{\beta}_1$, $\check{\beta}_2$ for $$\min_\beta\{\rho^2\} < \check{\rho}^2, \qquad (36)$$

$\check{\rho}$. Curve 116 shows this as Case C as bracketed by $[\hat{\beta}_1, \check{\beta}_1]$ and $[\hat{\beta}_2, \check{\beta}_2]$ as depicted by those portions 122 and 124 between dash line 120 for $\hat{\rho}$ and dash line 126 for $\check{\rho}$. Thus, the linear search must consider two ranges in Case C which curve 116 passes. On the other hand, if a speed constraint or maximum acquisition range is imposed, a narrower range for the optimal solution may be established.

It should be noted that the maximum range constraint may be absorbed into the range-at-time of constraint once $\rho_N$ is established by the flash ranging active radar fix. As usual, the bandwidth $\Omega$ is geared to the precision to which $\rho_N$ is known and is small when $\rho_N$ is believed to be accurate.

Although the above description adequately illustrates the operation of the preferred embodiment, Appendix B (Appendix A and B are available in filewrapper) as stated previously provides a source code listing to more explicitly illustrate a functioning example the operation of the "flash ranging" as well as conversion aspects of the preferred embodiment.

Although the present invention and its advantages have been described in detail, it should be understood that various changes, substitutions and alterations can be made herein without departing from the spirit and scope of the invention as defined by the appended claims.

We claim:

1. A method for covertly determining and predicting target data relative to a predetermined position, comprising the steps of:
   (a) passively sensing a target to produce a passive target data set;
   (b) relating said passive target data set to said predetermined position to produce a transformed passive data set;
   (c) comparing said transformed passive data set to a predicted target data set to generate a measurement error;
   (d) actively sensing said target for a minimally detectable period of time to produce an active target data set;
   (e) relating said active target data set to said measurement error to produce a system error; and
   (f) changing said predicted target data set in response to said system error.

2. The method of claim 1, further comprising the step of repeating steps (a) through (f) to covertly determine said target data continuously relative to said predetermined position.

3. The method of claim 1, wherein said passively sensing step further comprises the step of generating azimuth and elevation data relative to an ownship sensor.

4. The method of claim 3, wherein said passive target data set relating step further comprises the step of relating said azimuth and elevation data to an inertial navigation system position.

5. The method of claim 1, further comprising the step of constraining said active target data set by a plurality of penalty functions upon determining that a certain aspect of said active target data set exceeds a predetermined limit.

6. The method of claim 1, wherein said predicted target data set comprises predicted bearing data, said predicted bearing data including predicted azimuth data and predicted elevational data.

7. The method of claim 1, further comprising the step of limiting said changing step by a perturbation magnitude, said perturbation magnitude associated with said system error.

8. A method for covertly determining and predicting target data relative to a predetermined position, comprising the steps of:
   (a) passively sensing a target to produce a passive target data set;
   (b) relating said passive target data set to said predetermined position to produce a transformed passive data set;
   (c) comparing said transformed passive data set to a predicted target data set to generate a measurement error;
   (d) actively sensing said target for a minimally detectable period of time to produce an active target data set;
   (e) relating said active target data set to said measurement error to produce a system error;
   (f) changing said predicted target data set in response to said system error; and
   (g) constraining said active target data set by a plurality of penalty functions upon determining that a certain aspect of said active target data set exceeds a predetermined limit, said plurality of penalty functions including a maximum acquisition range penalty associated with a maximum acquisition range aspect of said active target data set.

9. A method for covertly determining and predicting target data relative to a predetermined position, comprising the steps of:
   (a) passively sensing a target to produce a passive target data set;
   (b) relating said passive target data set to said predetermined position to produce a transformed passive data set;
   (c) comparing said transformed passive data set to a predicted target data set to generate a measurement error;
   (d) actively sensing said target for a minimally detectable period of time to produce an active target data set;
   (e) relating said active target data set to said measurement error to produce a system error;
   (f) changing said predicted target data set in response to said system error;
   (g) constraining said active target data set by a plurality of penalty functions upon determining that a certain aspect of said active target data set exceeds a predetermined limit; and
   (h) using said plurality of penalty functions to associate small weights with said active target data set when a predetermined aspect of said active target set falls within said predetermined limit and associated large weights with said active target data set when said predetermined aspect falls outside said predetermined limit.

10. A method for covertly determining and predicting target data relative to a predetermined position, comprising the steps of:
   (a) passively sensing a target to produce a passive target data set;
   (b) relating said passive target data set to said predetermined position to produce a transformed passive data set;
   (c) comparing said transformed passive data set to a predicted target data set to generate a measurement error;
   (d) actively sensing said target for a minimally detectable period of time to produce an active target data set;
   (e) relating said active target data set to said measurement error to produce a system error;
   (f) changing said predicted target data set in response to said system error; and
   (g) constraining said active target data set by a plurality of penalty functions upon determining that a certain aspect of said active target data set exceeds a predetermined limit, said plurality of penalty functions including a speed penalty associated with a speed measurement aspect of said active target data set.

11. A method for covertly determining and predicting target data relative to a predetermined position, comprising the steps of:
   (a) passively sensing a target to produce a passive target data set;
   (b) relating said passive target data set to said predetermined position to produce a transformed passive data set;
   (c) comparing said transformed passive data set to a predicted target data set to generate a measurement error;
   (d) actively sensing said target for a minimally detectable period of time to produce an active target data set;
   (e) relating said active target data set to said measurement error to produce a system error;
   (f) changing said predicted target data set in response to said system error;
   (g) limiting said changing step by a perturbation magnitude, said perturbation magnitude associated with said system error; and
   (h) limiting said perturbation magnitude using a linear search procedure.

12. The method of claim 11, wherein said linear search procedure includes a cubic interpolation method for limiting said perturbation magnitude.

13. A method for covertly determining and predicting target data relative to a predetermined position, comprising the steps of:
   (a) passively sensing a target to produce a passive target data set;
   (b) relating said passive target data set to said predetermined position to produce a transformed passive data set;

(c) comparing said transformed passive data set to a predicted target data set to generate a measurement error;

(d) actively sensing said target for a minimally detectable period of time to produce an active target data set;

(e) relating said active target data set to said measurement error to produce a system error;

(f) changing said predicted target data set in response to said system error; and (g) limiting said changing step by a perturbation direction, said perturbation direction associated with said system error.

14. A method for covertly determining and predicting target data relative to a predetermined position, comprising the steps of:

(a) passively sensing a target to produce a passive target data set, said passive target data set including early sighting data for advising of a flight path of said target;

(b) relating said passive target data set to said predetermined position to produce a transformed passive data set;

(c) comparing said transformed passive data set to a predicted target data set to generate a measurement error;

(d) actively sensing said target for a minimally detectable period of time to produce an active target data set;

(e) relating said active target data set to said measurement error to produce a system error; and (f) changing said predicted target data set in response to said system error.

15. A system for covertly determining and predicting target data relative to a predetermined position, comprising:

a passive sensor for passively sensing a target to produce a passive target data set;

coordinate transformation circuitry for relating said passive target data set to said predetermined position to produce a transformed passive data set;

comparison circuitry for comparing said transformed passive data set to a predicted target data set and thereby generating a measurement error;

an active sensor for actively sensing said target for a minimally detectable period of time to produce an active target data set;

system error circuitry for relating said active target data set to said measurement error to produce a system error; and perturbation circuitry for changing said predetermined target data set in response to said system error.

16. The system of claim 15, further comprising circuitry for iteratively changing said predicted target data set in response to said system error and thereby covertly determining target data continuously relative to said predetermined position.

17. The system of claim 15, further comprising circuitry for determining azimuth and elevation data of said target relative to said predetermined position.

18. The system of claim 15, further comprising circuitry for relating passive sensor azimuth and elevation data to a set of data from an inertial navigation system.

19. The system of claim 15, further comprising constraint functions circuitry for constraining said active target data set by a predetermined set of penalty functions.

20. The system of claim 19, wherein said predetermined set of penalty functions impose small penalties for data within said active target data set which is inside predetermined limits and subsequentially larger penalties for data within said active target data set which is outside said predetermined limits.

21. The system of claim 20, wherein said predetermined set of penalty functions include a speed penalty function.

22. The system of claim 20, wherein said predetermined set of penalty functions include a maximum acquisition range penalty function.

23. The system of claim 15, wherein said predicted target data set includes predicted target bearing data, said predicted target bearing data further includes predicted target azimuth data and predicted target elevation data.

24. The system of claim 15, wherein said perturbation circuitry further comprises circuitry for determining perturbation magnitude and perturbation direction.

25. The system of claim 24, wherein said circuitry for determining perturbation magnitude and perturbation direction comprises circuitry for performing a linear search using a cubic interpolation method.

* * * * *